Patented May 8, 1945

2,375,278

UNITED STATES PATENT OFFICE 2,375,278

VITAMIN FORTIFIED PRODUCT

Loran O. Buxton, Newark, N. J., assignor to National Oil Products Company, Harrison, N. J., a corporation of New Jersey No Drawing. Application May 7, 1942,
Serial No. 442,077

2 Claims. (Cl. 99—11)

This invention relates in general to vitamin products, and more particularly to stable vitamin-containing products in a substantially dry form.

For many purposes it is highly desirable to have stable products highly potent in fat-soluble vitamins which are available in a substantially dry form. For instance, in the fortification of ground and mixed feeds for livestock, poultry, etc., it would be highly desirable to have a stable, dry, fat-soluble vitamin-containing product which could be readily admixed with such feeds. At the present time it is a rather common practice to add fat-soluble vitamins, particularly vitamins A and D, to livestock and poultry feeds by admixing therewith fish oils, such as cod liver oil, other fish liver oils, sardine oil, etc. However, feeds which are fortified with fat-soluble vitamins in such a manner rapidly lose their vitamin potency, especially in the case of vitamin A. Various attempts have been made to produce dry products containing fat-soluble vitamins in a stable form. For instance, it has been proposed to impregnate yeast with vitamin-containing fish oils, and then coat the yeast particles on which the oil is absorbed with a gum such as karaya gum. However, such proposals have not proved to be satisfactory. In other cases it has been proposed to coat vegetable meal particles with a mixture of a fish oil and a wax such as paraffin wax. Another proposal has been to combine the use of a wax and a gum; however, none of these methods have provided satisfactory stable, dry carriers of fat-soluble vitamins. Furthermore, the use of such materials as paraffin wax, which is not assimilable by the body, is not desirable. As yet, no one has devised a commercially satisfactory method of incorporating fat-soluble vitamins obtainable from fish livers into other materials, such as vegetable meals, etc., in order to produce stable vitamin products in a substantially dry form.

Certain types of fish livers, particularly fish livers obtainable from sword fish, whales, spear fish, mackerel and tuna fish, have their oil content so entrapped in the liver cells that it is very difficult to remove the oil from the livers by solvent or pressure extraction methods. Various fish livers from which the major portion of the oil may be readily removed by solvent extraction or pressure methods usually contain appreciable amounts of fat-soluble vitamins after the major portion of the oil has been removed. Livers such as those in which the oil is not readily removed or livers from which the major portion of the oil has been removed, are oftentimes of little value except for such purposes as fertilizers, etc. Thus, a potential valuable source of vitamins A and D frequently is practically a total loss.

It is the object of this invention to produce highly stable, fat-soluble vitamin-fortified, dry food products.

A further object of this invention is to provide efficient dry carriers for fat-soluble vitamins of fish origin.

Another object of this invention is to provide means for more efficient utilization of the vitamins contained in fish livers and fish liver oils.

Other objects of the invention will in part be obvious and will in part appear hereinafter.

I have found that the foregoing and other objects of the invention may be successfully accomplished by intimately mixing finely sub-divided fish livers with hydrophilic vegetable materials such as vegetable meals, pulps, etc. If desired, after mixing, the mixture is allowed to dry if it is not already in a substantially dry state, and then ground and further mixed to insure uniform distribution of the vitamins with the meal. In this manner excellent, dry, vitamin-fortified food products suitable for use as such in the feeding of livestock, poultry, etc., may be produced. These dry vitamin products are also quite suitable for the fortification of livestock and poultry feeds with fat-soluble vitamins. The products of my invention contain the fat-soluble vitamins in a very stable form. Since the vitamins are still contained in the individual liver particles, the vitamins at no time during the process or after incorporation into the meals are exposed to the oxidizing influences of the atmosphere. Furthermore, the fat-soluble vitamins are in intimate contact with the natural antioxidants of the fish livers and are thus further protected from oxidation. Also, in most cases the vegetable material which is used contains natural antioxidants which further increase the stability of the products obtained. Fish livers usually contain appreciable percentages of water, but in most cases the hydrophilic vegetable material will absorb a sufficient amount of the water content of the livers to produce a substantially dry product. In case the product which is obtained on mixing the comminuted fish liver with the vegetable material is not substantially dry, it may be dried to the desired moisture content by mildly heating it under reduced pressure. If desired, the fish livers may be dehydrated to some extent before mixing them with the meal. By heating the livers, either before or after grinding, to a temperature of around 80 to 85° C. under reduced pressure, any excess water may be removed along with certain volatile constituents of the fish livers which tend to give the livers undesirable tastes and odors. Also the heat treatment will destroy various enzymes which might tend to cause the liver particles to undergo decomposition.

Various livers may be utilized in producing the products of my invention; preferably fish livers in which the oil is not readily removable by solvent extraction or pressure processes due to the fact that the oil is firmly entrapped in the liver cells, e. g., tuna fish livers, sword fish livers, ling cod livers, mackerel livers, whale livers, spearfish livers, etc.; also other fish livers in which the major portion of the oil has been removed by solvent extraction or pressure processes may be utilized, since appreciable quantities of vitamin-containing oils usually remain in the livers. Furthermore, it has been found that in some instances not all of the vitamins are contained in the oil, but are intimately associated with the liver cells. Thus, for example, fish livers such as cod livers, shark livers, halibut livers, etc., may also be employed. Some fish livers contain relatively larger amounts of vitamin A than of vitamin D, whereas certain other fish livers are relatively highly potent in vitamin D. Thus, in some cases, it may be desirable to employ mixtures of such fish livers in order to produce a dry carrier containing the proper ratio of vitamin A to vitamin D. Thus, for example, a dry carrier may be produced employing a mixture of swordfish livers, which are high in vitamin A, and tuna fish livers, which are high in vitamin D.

Any hydrophilic vegetable material may be admixed with the finely sub-divided fish livers, although in most cases it is preferred to use a vegetable material which contains appreciable quantities of natural antioxidants. Among other vegetable materials there may be mentioned vegetable meals such as soybean meal, cottonseed meal, linseed meal, wheat germ meal, corn germ meal, oatmeal, corn meal, alfalfa meal, wheat bran, sesame seed meal, by-products from the distilling industry such as dried distillers corn solubles and dried distillers rye solubles, etc., and vegetable pulps such as tomato pulp, citrus fruit pulps, etc. In most cases, it is preferred that the meal be relatively oil-free, i. e., contain not more than about 8 percent of oil.

In carrying out the process of the invention, the livers are first ground, chopped or otherwise finely sub-divided and are then thoroughly admixed with the vegetable material, which has also been ground or chopped to a relatively small particle size. If the product which is obtained appears to be slightly damp, it may be dried to some extent at a relatively mild temperature, e. g., about 80 to 85° C., under reduced pressure. Usually, however, such drying will not be necessary, since the vegetable material will absorb sufficient of the water contained in the liver particles to produce a substantially dry mass. If desired, the livers either before or after grinding may be given a heat treatment to drive off any excess moisture and various volatile constituents which might tend to give the vitamin product an objectionable taste and odor. Such heat treatment, as mentioned hereinabove, will also inactivate any enzymes in the liver which might tend to cause deterioration of the vitamin product. Various preservatives, such as sodium benzoate, may be added in small quantities to prevent any bacterial action taking place in the vitamin product. In most cases, it is preferred that about 2 to 5 parts of vegetable material be employed for every part of fish liver; however, this ratio may be varied.

The products of the invention may in some instances be advantageously modified by coating the liver-meal particles with some protective colloid such as gelatin, zein, pectin, etc. This may readily be accomplished by admixing the liver-meal vitamin product with a solution of gelatin or other colloid and then allowing the coated particles to dry. This protective coating will further increase the stability of the fat-soluble vitamins towards oxidative deterioration.

For a fuller understanding of the nature and objects of the invention, reference should be had to the following examples which are given merely to further illustrate the invention and are not to be construed in a limiting sense, all parts given being by weight.

*Example I*

500 parts of crude swordfish liver containing approximately 10,000 I. U. of vitamin A per gram were finely ground. No appreciable oil could be obtained from the finely ground livers by subjecting them to 20,000 pounds pressure in a cold pressing apparatus or by extracting the ground mass with solvents such as ethylene dichloride or ethyl ether. 1000 parts of cottonseed meal were added to the finely ground liver mass and the mixture thoroughly stirred. The homogeneous mixture was then spread in a thick layer and allowed to dry at room temperature. The dry mass was then re-ground. The resulting powdered material, which had a vitamin A potency of approximately 3,300 units per gram, was completely devoid of oiliness and possessed only a slight odor. The product exhibited excellent stability on being stored for several months.

*Example II*

500 parts of swordfish liver were ground as in Example I and the finely ground mass placed in a vacuum dessicator and heated to 85° C. for one hour under a slight vacuum to inactivate the various liver enzymes. The heated mass was then allowed to cool and treated further as in Example I. The resulting powdered material which exhibited excellent stability was completely devoid of oiliness and possessed only a slight odor.

*Example III*

10 parts of a powdered carrier prepared as in Example I were placed in a container and 5 parts of a solution of warm (40° C.) gelatin in water (1 part of gelatin to 4 parts of water) were added slowly with stirring until a thick semi-liquid mass was formed. The semi-liquid mass was allowed to dry and was then ground, and it was found that no traces of oil or powdered carrier could be detected, indicating that each particle of the powdered carrier which had adsorbed thereon a definite proportion of the ground liver mass was thoroughly coated with a layer of the protective colloid.

*Example IV*

100 parts of tuna fish livers containing 15,000 I. U. of vitamin A per gram and 4,000 U. S. P. units of vitamin D per gram were finely ground and mixed thoroughly with 300 parts of linseed oil meal essentially as described in Example I. The resulting product was a free-flowing dry powder, substantially non-oily and exhibited excellent stability.

It can be seen from the above description that highly stable fat-soluble vitamin-containing products in a dry form may be prepared by the process of my invention. In addition to being a valuable source of fat-soluble vitamins, fish livers are also an excellent source of various of the vitamin B factors and certain minerals, for example, iron, copper, manganese, etc. The fish livers are also excellent sources of protein which will supplement the animals' diet. Thus, in addition to having a dry product in which the fat-soluble vitamins are in very stable form, a product is obtained which contains other valuable supplements to the animals' ration. As previously mentioned, the products of the invention may be utilized as such or they may be admixed with various prepared ground and mixed feeds for livestock and poultry. Although my dry vitamin products are particularly adapted for supplementing and fortifying the feeds of livestock and poultry, they are also suitable for various other uses, such as, for example, incorporation into dog foods, cat foods, etc., to provide efficient sources of fat-soluble vitamins, proteins, etc.

The expressions "comminuted fish livers" and "comminuted vegetable material" are used herein to connote fish livers and vegetable materials, respectively, which have been ground, chopped, or otherwise finely subdivided. The oil-bearing seed meals used according to the invention may be produced by either the expeller, cold pressing or solvent extraction method. Such meals usually contain a maximum of about 5% to 8% fatty material and fall within the expression "relatively oil-free vegetable material."

Since certain changes in carrying out the above process and certain modifications in the product which embody the invention may be made without departing from its scope, it is intended that all matter contained in the above description shall be interpreted as illustrative and not in a limiting sense.

Having described my invention, what I claim as new and desire to secure by Letters Patent is:

1. A process of preparing a dry vitamin food product devoid of oiliness, which consists in comminuting raw fish livers selected from the class consisting of fish livers having a difficultly removable oil content which cannot be liberated by finely grinding said livers and admixing the comminuted fish livers with dry, comminuted hydrophilic vegetable material in the ratio of one part of livers to two to five parts of said vegetable material to produce a mass wherein the fat-soluble vitamins remain locked in the individual liver particles.

2. A process of preparing a dry vitamin food product devoid of oiliness, which consists in comminuting raw fish livers selected from the class consisting of fish livers having a difficultly removable oil content which cannot be liberated by finely grinding said livers, admixing the comminuted fish livers with dry, comminuted hydrophilic vegetable material in the ratio of one part of livers to two to five parts of said vegetable material to produce a mass wherein the fat-soluble vitamins remain locked in the individual liver particles, coating the vegetable material-liver particles with a thin film of gelatin and drying said particles.

LORAN O. BUXTON.